METHOD AND APPARATUS FOR THE RECORDING AND TRANSMITTING
OF MESSAGES ON AND FROM A STORER
Filed March 21, 1966
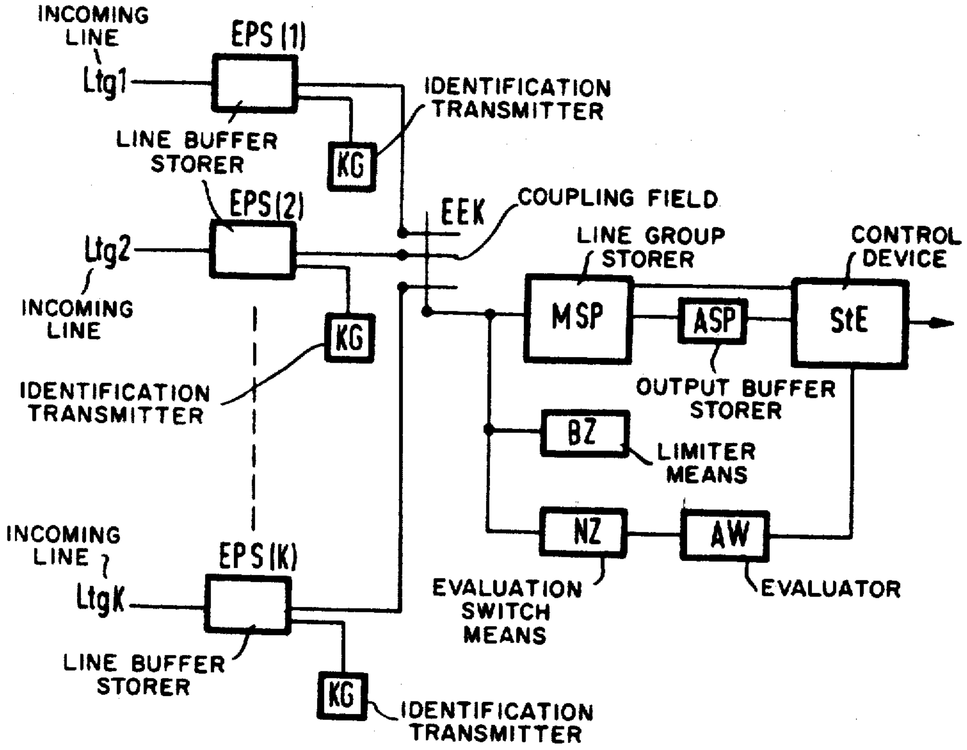
INVENTORS
Horst Gehrmann
Winfried Graf
Karl Schneider
BY Spiess Spiess ATTORNEYS 3,414,888

METHOD AND APPARATUS FOR THE RECORDING AND TRANSMITTING OF MESSAGES ON AND FROM A STORER

Horst Gehrmann, Munich, Winifried Graf, Munich-Solln, and Karl Schneider, Munich, Germany, assignors to Siemens Aktiengesellschaft, a corporation of Germany
Filed Mar. 21, 1966, Ser. No. 536,005
Claims priority, application Germany, Mar. 24, 1965, S 96,141
11 Claims. (Cl. 340—172.5)

ABSTRACT OF THE DISCLOSURE

A storage communication arrangement for the recording and restransmitting of messages over several incoming lines, in which respective buffer storers are operative to store only a fractional segment of an average message on a corresponding line, and a group storer operatively connected with a plurality of buffer storers for receiving the contents of the buffer storers from which the respective fractional segments of a message are subsequently retransmitted in their original sequence.

The invention relates to a method and a circuit arrangement for the recording and retransmitting of messages, coming in over several lines, in a storer preferably allocated to a plurality of lines in common, in particular a tape storer.

It is a known practice in telegraph storage communications technology, when messages come in over several incoming lines, to permanently connect each line with a storer or else in each case to allocate one of a number of storers, over selector switching means to the involved calling line. In both cases, however, the capacity of the storer is always so dimensioned that it can with certainty hold a message of average length. Accordingly, the storer can also remain connected with the line until the conclusion signal of the message has been received. The allocation of the storers over selector switching means, especially during the main traffic periods, has the disadvantage that for some lines there is no longer any storer available as all are already occupied by other lines. In the utilization of a permanent allocation of storers to the incoming lines there results a very high expenditure in storers, since even for lines with little traffic, each has to be provided with its own storer which cannot, during a main traffic period, be allocated to another line.

This problem of connecting storers occurs in storage communication installations not only in the initial stage of the transmission, but also in the intermediate and output storage stages.

The invention has as its basic problem that of constructing the respective storage stages of a storage communication installation in such a way that it does not present the described disadvantages with respect to capacity and allocation. For the solution of this problem, the invention proceeds from the concept of recording the individual messages, not as heretofore, in a continuous form, but in individual parts or segments intermixed with one another. According to the invention, this problem is solved by a method in which the messages arriving at a certain telegraphy speed over the individual lines are initially conducted, in each case, to a respective line buffer storer which will accept only a fraction of a message. The message segment so stored in the respective line buffer storers is restored from time to time, in a noncoherent sequence, at a sending speed, which is increased above the original storage speed, into a line group storer provided in common for a group of line buffer storers, from which, over an output buffer storer likewise accepting only a fraction of a message, the individual message segments are again retransmitted in their original sequence but with a transmission speed increased above normal transmission speed.

In this manner it is possible according to the invention, even with very severely loaded lines, for example those carrying a great proportion of traffic, to allocate only a small buffer storer and yet to have available at all times the full capacity of a line group storer. The production costs of a storer stage, regardless of whether an input, an intermediate or an output storage stage is involved, can, accordingly, be considerably reduced.

Within the scope of the invention, for a certain number of line buffer storers there can be connectable a likewise determined number of line group storers, which differs in number from that of the line buffer storers, with each line group storer being connectable, over selector switching means, with each line buffer storer. In this manner it is possible to especially well match the overall capacity of the storage stage to the particular traffic. The number of line buffer storers to be accommodated in a group is derived from the relation of the telegraphing speed at the input of the line buffer storer to that at the output of the line group storer. The greater the telegraphing speed at the output of the line group storer, the greater the number of line buffer storers that can be placed into one group.

One possibility for the expansion of a group of line buffer storers utilizes a method in which lines with little traffic can be connected with lines which have a great proportion of traffic, into one group. It is then possible to provide, for a predetermined number of line buffer storers, only one line group storer, to which each line buffer storer is accessible over selector switching means.

An especially advantageous circuit arrangement for the practice of the invention comprises an arrangement in which, to each incoming line, only one line buffer storer is allocated, which is so dimensioned in its capacity that it accepts a fraction or segment of an average message, for example a message block, there being provided for a predetermined number of line buffer storers a line group storer with an appertaining output buffer storer, and that there is utilized for the restoring operations, from both the line buffer storers into the line group storers and also from the line group storers into the output buffer storers, transmitting means which employs a transmission speed which is increased over the original transmission speed of the incoming messages.

Details of the invention will appear from the embodiment of the invention described with the aid of the drawing, in which there are represented at the left hand side incoming lines L*tg*1, L*tg*2 to L*tgk*. To each line there is allocated a line buffer storer EPS, in which each incoming message is stored. Within the scope of the invention the capacity of such line buffer storer is so dimensioned that each line buffer storer can, without utilization of a predetermined reserve capacity, accept a certain fraction of an average message, for example, a message block. Core storers are especially well suited as line buffer storers. To a number of line buffer storers, in this example the number 1 to *k*, there is allocated a line group storer MSP, appearing in the middle of the drawing. Such line group storer can be controlled over the coupling field EEK by each of the line buffer storers. Within the scope of the invention, instead of a single line group storer there could be employed, for example, four or five line group storers which are provided for the number of 1 to *k* of line buffer storers.

The line group storer MSP may, within the scope of the invention, be a magnetic tape storer with its own recording and sending mechanism, the drive of which is adjustable in the forward and also in the reverse direction for several different scanning speeds. With like advantage, however, it would also be possible to use for this purpose a core storer or a known type foil or drum storer. To the line group storer MSP there is allocated evaluating switching means NZ, in which there are registered, for example, the identifications of the individual messages, in addition to which the clearing or terminal signal evaluation is carried out and, in dependence thereon, the control of the reading out device of the line group storer MSP.

For this purpose the evaluation switching means NZ provides corresponding information units, which are further completed by the evaluator AW, and transmitted to the control device S*t*E, which evaluates them and, if necessary, converts them into control functions or commands for the line group storer MSP, which then delivers the messages stored therein over the output buffer storer ASP to the control device S*t*E and the line connected thereto.

Also allocated to the line group storer is a limiter BZ which assures that not more than, say, five line buffer storers can be simultaneously operatively connected to the line group storer. Within the scope of the invention the limiter BZ can also be so actuated in dependence on the occupation of the line group storers, that in the event of light traffic less than five and in the case of heavy traffic even more than five line buffer storers per line group storer are admitted.

To the line group storer MSP there is further connected at the output side an output buffer storer ASP, over which output buffer storer the further devices for the communication transmission are to be reached.

The detailed operation of the circuit is as follows:

An incoming message is conducted, for example, into the line buffer storer EPS1. As soon as a certain number of message units, say 100 signals, is stored in the input buffer storer, the line buffer storer establishes a connection over the coupling field EEK to the line group storer MSP and stores into the line group storer, at a considerably higher sending speed, the message which it contained. The speed relation may, for example, be such that the line buffer storer EPS stores at a transmission speed of 50 bands and the transfer from the line buffer storer into the line group storer is carried out at a speed of 3500 bands. With these values, the occupation time therefor of the line group storer then amount to $\frac{1}{70}$ of the occupation time of the line buffer storer.

Within the scope of the invention the line buffer storers may have at their disposal their own respective identification transmitters KG which also impart to each message block which is retransmitted to the line group storer, an appertaining identification. This identification may, for example, consist in a running number, in a line identification or binary-coded information.

Within the scope of the invention, however, the subsequent restoring from the line buffer storers into the line group storer also could be carried out in a predetermined cycle which is established by the communication itself or through the line group storer. In this case there then would be necessary as evaluating circuit means in order to subsequently read out the message from the line group storer, a counting device, for example, a ring counter, which continuously determines (in ordinal sequence) which message block belongs to a message. Moreover, in this case only the first and last message fraction respectively would have to be provided with starting and concluding signals.

As soon as storage into the line group storer is completed, i.e., as soon as a message is completely contained in the line group storer, by evaluation of the clearing signal, the line group storer can be caused to read out the message there contained over the output buffer storer to further devices of the communication system. In this case, for example, with a tape storer, the line group storer then would first rewind the tape and scan from the beginning to reassemble the individually identified blocks of the original sequence into the message or else to determine, through the rhythm established within the cycle, the corresponding message portion.

In particular, the reading out can be so effected that the evaluating switching means NZ in each case reads out a message identification that it has received by readying it in a connected evaluator AW. The sending side of the line group storer MSP then begins to operate in forward direction and with a special evaluator, not illustrated, ascertain the first block with, for example, the first two identifying letters AC. If this block is found, a third letter can then be additionally evaluated. The next following four signals are then evaluated. If, for example, it is the letters ZCZC, then the beginning of the traced message is ascertained.

If signals other than the signals ZCZC are present, the tape is then shifted over to reverse running, since under this condition the block with the beginning of the message is to be found on the opposite side.

After establishing the beginning of the message, a running number comparison is carried out. If the block contains parts of the address, this is then communicated to a responsive connection circuit (not represented) and the connection is built up. If the following blocks belong to other messages (other block identifications) they are run over at a speed of 3500 bands. This speed is possible because in this case the tape stop command by the evaluator, which is set for ACX, is suspended and the block stored in the output buffer storer can immediately be erased.

The next block belonging to message ACX, if it contains the rest of the address, is likewise transferred to a setting installation (not represented). After the establishment of connections, the block with the message commencement is again searched through the return. If it is found, the message is then transferred blockwise to the intermediate storer.

In the transmission to the intermediate storer (not represented) the first block, which contains ZCZC can be marked by the line group storer MSP on the third track of the tape. Thereby, the identification heretofore utilized for the message ACX becomes free, so that this letter sequence can be so used for the identifying of a newly arriving message.

Within the scope of the invention a marking in a separate, say, third track can be dispensed with if the identification at the beginning and at the end of each block additionally contains this information.

The reading out of the message parts contained in a line group storer into the output buffer storer likewise, can be carried out, within the scope of the invention, at an increased speed, for example 3500 bands.

The present invention is not limited to the example of construction illustrated, but can, within the scope of the invention, also be so realized that, for example, to a certain number "*k*" of input buffer storers there is allocated a further determined number, which is different from the number "*k*" of line group storers, for example "*m*," in which case the number "*m*" obviously would be smaller than "*k*."

Changes may be made within the scope and spirit of the appended claims which define what is believed to be new and desired to have protected by Letters Patent.

We claim:

1. A circuit arrangement for the recording and retransmitting of messages over several incoming lines at a predetermined transmission speed, comprising line buffer storers, each of which is operatively connected to a respective incoming line and has a capacity for storing only a fractional segment of an average message, a line group storer operatively connectable with a predetermied number of line buffer storers, an output buffer storer operatively connected to said line group storer, said output buffer storer likewise having a capacity for storing only such a fractional segment of a message, means for transmitting message segments from the respective line buffer storers into said line group storer at a speed which is greater than said incoming transmission speed, means for transmitting segments of a message from the line group storer to the output buffer storer, and from the latter in their original sequence at a transmission speed which is greater than said predetermined incoming transmission speed.

2. A circuit arrangement according to claim 1, wherein the number of line group storers provided for a determined number of line buffer storers corresponds to the relation of the incoming transmission speed to the increased transmission speed employed.

3. A circuit arrangement according to claim 1, comprising in further combination, an identification transmitter for each line buffer storer, connected thereto and operative to provide a characteristic identification for each message segment, which is transmitted, with the associated segment, to the line group storer.

4. A circuit arrangement according to claim 3, in which said identification transmitter is operative to supply said identification for sequential transmission with the associated segment to said line group storer, and corresponding storage therein.

5. A circuit arrangement according to claim 3, in which said identification transmitter is operative to supply said identification for parallel transmission with the associated segment to said line group storer and corresponding storage therein.

6. A circuit arrangement according to claim 1, wherein a single identification transmitter is connectable to each of a plurality of line buffer storers, and which is operative to transmit along with the first and last fractional segment of a message, an initial and a terminal signal, respectively, to said line group storer, and means cooperable with said means for transmitting message segments from the line buffer storers to the line group storer, for operatively connecting the respective line buffer storers to the line group storer in a predetermined permanent sequence for the restoring of the respective message segments in the line group storer.

7. A circuit arrangement according to claim 1, comprising evaluating means operatively connected with the means for transmission to the group storer and to the latter, operable upon evaluation of a terminal signal to actuate said line group storer whereby the latter reads out the segments of a message for transmission to the output buffer storer at an increased transmission speed.

8. A circuit arrangement according to claim 1, wherein said line group storer comprises a magnetic tape storer having a tape drive in both forward and reverse directions and is adjustable for a plurality of different scanning speeds.

9. A circuit arrangement according to claim 1, wherein a plurality of line group storers are provided, each of which is connectable with said line buffer storers, and a respective limiting circuit operatively connected to each line group storer operative to limit the number of line buffer storers operatively connected thereto, said limiting circuit having initial and terminal evaluating means and a message counting circuit operatively connected therewith.

10. A circuit arrangement according to claim 1, wherein said means for transmitting message segments from the line buffer storers to the line group storer comprises coupling field means for effecting connections of each respective line buffer storer to the cooperable line group storer.

11. A circuit arrangement according to claim 1, wherein a plurality of line group storers are provided for a plurality of line buffer storers and said means for transmitting message segments from the line buffer storers to respective line group storers comprising a coupling field for selectively effecting connection of the respective line buffer storers to the respective line group storers.

References Cited

UNITED STATES PATENTS

| | | | |
|---|---|---|---|
| 3,185,823 | 5/1965 | Euersick et al. | 235—154 |
| 3,281,793 | 10/1966 | Oeters et al. | 340—172.5 |
| 3,331,060 | 7/1967 | Willis | 340—172.5 |
| 3,340,514 | 9/1967 | Swift | 340—172.5 |
| 3,344,406 | 9/1967 | Vinal | 340—172.5 |

PAUL J. HENON, *Primary Examiner.*

RAULFE B. ZACHE, *Assistant Examiner.*